United States Patent
Schumacher et al.

(10) Patent No.: US 8,076,795 B2
(45) Date of Patent: Dec. 13, 2011

(54) DEVICE FOR SUPPLYING AN IGNITION CURRENT FROM AN ENERGY RESERVE TO AT LEAST ONE IGNITION POWER MODULE

(75) Inventors: Hartmut Schumacher, Freiberg (DE); Bernd Roos, Flein (DE); Ruediger Karner, Kornwestheim (DE); Alain Jousse, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 555 days.

(21) Appl. No.: 10/590,876

(22) PCT Filed: Jan. 10, 2005

(86) PCT No.: PCT/EP2005/050079
§ 371 (c)(1),
(2), (4) Date: Jul. 10, 2007

(87) PCT Pub. No.: WO2005/082679
PCT Pub. Date: Sep. 9, 2005

(65) Prior Publication Data
US 2007/0289855 A1 Dec. 20, 2007

(30) Foreign Application Priority Data
Feb. 27, 2004 (DE) .......................... 10 2004 010 135

(51) Int. Cl.
*B60R 22/00* (2006.01)
(52) U.S. Cl. .................................... 307/10.6
(58) Field of Classification Search ................. 307/10.6, 307/10.1
See application file for complete search history.

(56) References Cited

U.S. PATENT DOCUMENTS

| 5,420,790 | A | | 5/1995 | Ravas, Jr. et al. | |
|---|---|---|---|---|---|
| 5,459,449 | A | | 10/1995 | Ravas, Jr. et al. | |
| 5,805,058 | A | * | 9/1998 | Saito et al. | 340/436 |
| 5,845,729 | A | * | 12/1998 | Smith et al. | 180/282 |
| 5,898,122 | A | * | 4/1999 | Davis et al. | 102/206 |
| 6,731,023 | B2 | * | 5/2004 | Rothleitner et al. | 307/64 |
| 7,352,080 | B2 | * | 4/2008 | Grasshoff | 307/10.1 |
| 2006/0012941 | A1 | * | 1/2006 | Heckel et al. | 361/247 |

FOREIGN PATENT DOCUMENTS

| DE | 35 06 487 | 9/1986 |
|---|---|---|
| DE | 39 21 305 | 1/1991 |
| DE | 691 01 169 | 11/1994 |
| DE | 197 48 311 | 5/1998 |
| DE | 38 76 454 | 11/1998 |
| DE | 198 26 704 | 2/2000 |
| DE | 100 57 917 | 5/2002 |

(Continued)

OTHER PUBLICATIONS

Belau H: "Zuendkondensator Entladeshaltung Fuer Airbagsysteme"; Jul. 8, 2000; p. 17.

(Continued)

*Primary Examiner* — Michael Rutland Wallis
(74) *Attorney, Agent, or Firm* — Kenyon & Kenyon LLP

(57) ABSTRACT

A device for supplying an ignition current from an energy reserve to at least one ignition power module, a voltage regulator being provided between the energy reserve and the at least one ignition power module, setting a voltage on the at least one ignition power module at a predetermined level.

6 Claims, 1 Drawing Sheet

FOREIGN PATENT DOCUMENTS

| | | |
|---|---|---|
| EP | 0 453 255 | 4/1991 |
| EP | 0 813 999 | 12/1997 |
| EP | 0 883 527 | 12/1998 |
| EP | 0 965 501 | 12/1999 |
| JP | 10129403 | 5/1998 |
| JP | 11-310102 | 11/1999 |
| JP | 2002166821 | 6/2002 |
| WO | WO 97/32757 | 9/1997 |
| WO | WO 97/32758 | 9/1997 |
| WO | WO 03/059681 | 7/2003 |
| WO | WO 2004051822 A1 * | 6/2004 |

OTHER PUBLICATIONS

Tietze: Semiconductor Switching Technology, 12$^{th}$ Edition, Springer-Publishing 2002, ISBN 3-540-42849-6, pp. 947, 957-960, particularly 959.

* cited by examiner

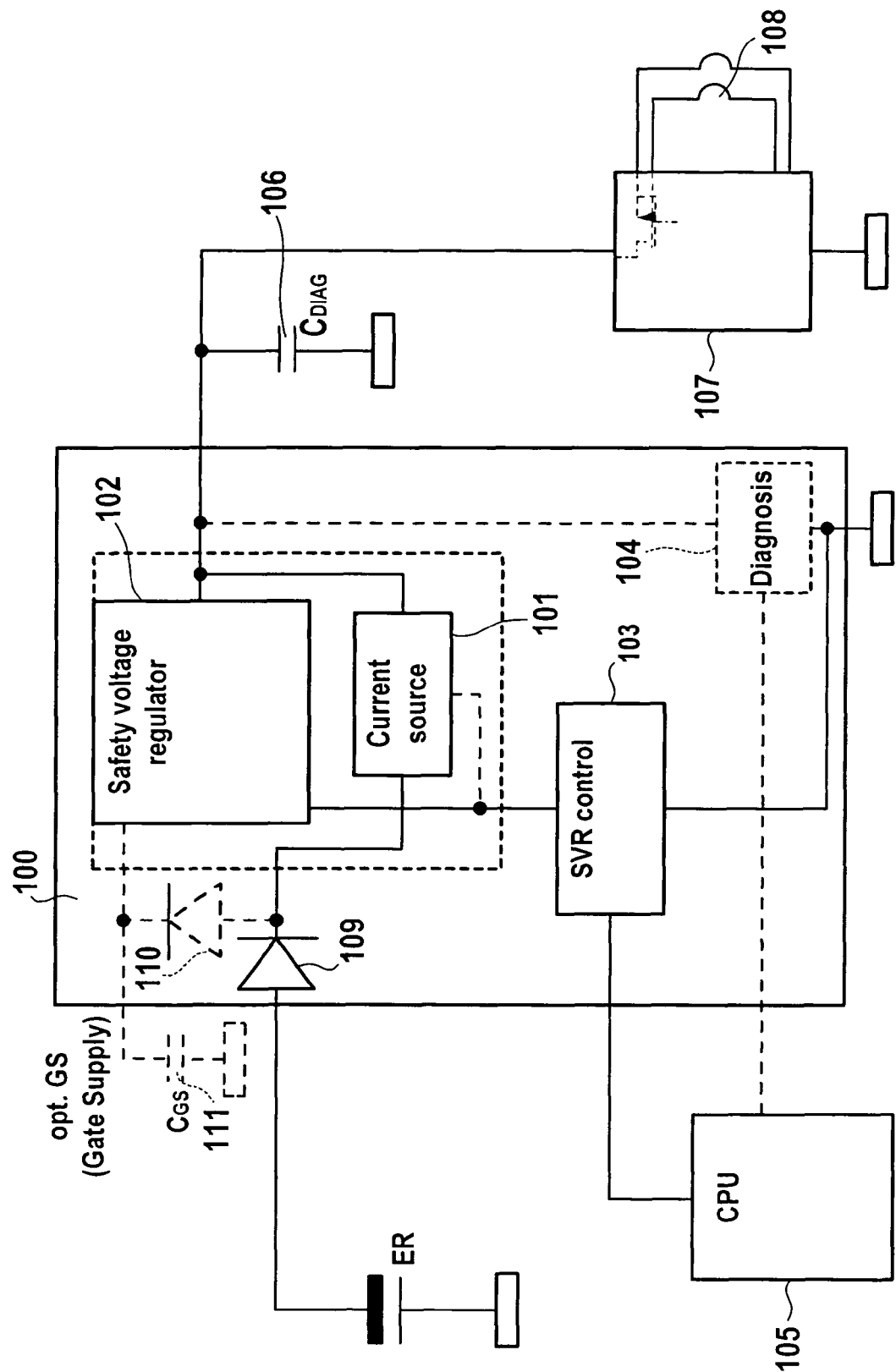

DEVICE FOR SUPPLYING AN IGNITION CURRENT FROM AN ENERGY RESERVE TO AT LEAST ONE IGNITION POWER MODULE

BACKGROUND INFORMATION

German Patent Application No. DE 100 57 917 describes how ignition power modules may be supplied with an ignition current from an energy reserve in the event of deployment. The ignition elements may then be ignited by this ignition current. The energy reserve is usually one or more capacitors, preferably electrolyte capacitors.

SUMMARY OF THE INVENTION

The device according to the present invention for supplying an ignition current from an energy reserve to at least one ignition power module has the advantage over the related art that a voltage regulator, which adjusts the voltage at the ignition power module to a predetermined level, is provided between the energy reserve and the ignition power module. To minimize power loss, the voltage regulator will set this level at the minimum possible level. In autarkic operation, i.e., in chopping of the battery voltage, the control unit itself consumes electric power from the energy reserve, resulting in a voltage drop in the energy reserve. In addition, in order for a control unit to operate further without fault during ignition of the ignition power module in an autarkic case, a much higher energy reserve voltage than necessary is built up on the internal resistor of the energy reserve capacitor to compensate for the voltage drop. However, this higher voltage results in the ignition power modules also having to be designed for a greater power loss. The voltage on the ignition power module is always kept at the lowest required level by positioning the voltage regulator according to the present invention between the energy reserve and the ignition power module. In the autarkic case without ignition, the voltage regulator has a high resistance because very little current is consumed by the control unit. If ignition occurs and the ignition power modules are released and therefore the ignition current flows, the internal resistance is lower, so the required ignition current is available. It is consequently possible for the ignition power modules to be designed for a lower power loss than was possible before. This makes the ignition power modules smaller, i.e., more advantageous to manufacture.

It is particularly advantageous that a disconnectable voltage regulator also has the function of a safety semiconductor, which allows electric current to be supplied to the at least one ignition power module (safety semiconductor on) or not (safety semiconductor off). The safety semiconductor is a separate component independent of the ignition power modules in order to successfully counteract a malfunction (including destruction) of the ignition power modules in such an event and thus prevent possible faulty deployment. As its name indicates, the safety semiconductor is implemented electronically.

In addition, a diagnosis may also be provided for the safety semiconductor. The diagnosis might be, for example, an activatable resistance load to ground, where the resistance simulates ignition. When the diagnostic resistance is enabled, the voltage at the ignition power module depends on the condition of the safety semiconductor: if the safety semiconductor is enabled, the voltage at the ignition power module is high; if the safety semiconductor is off, the voltage is low.

It is also advantageous for the safety semiconductor to have at least one power transistor, preferably a MOSFET transistor.

If an N-channel MOSFET transistor is used, an additional gate power supply with a diode and capacitor may also be advantageous. This input is an attenuated energy reserve voltage, so that during an energy reserve voltage drop, a higher voltage is available for gate triggering of the power transistor. Thus if the energy reserve drops down to a voltage lower than the regulated voltage (enabling the power transistor), a lower internal resistance ($R_{DS(ON)}$) of the transistor is achievable.

In addition, it may be advantageous for at least one current source to be assigned to the voltage regulator, e.g., for diagnosis of the at least one ignition power module. This current source triggers a diagnosis of the ignition power module by the fact that the current source supplies a current lower than the current necessary to trigger the ignition elements but nevertheless enough energy for the power module diagnosis is triggered in the diagnostic capacitor (capacitor between the safety semiconductor and the ignition power module). This makes it possible to detect aging processes in particular. The current source could be implemented directly on the voltage regulator, e.g., in the form of a regulated transistor which bridges the voltage regulator or a reversible current regulation.

It may also be advantageous for a polarity reversal protection diode to be provided between the energy reserve and the voltage regulator; this would have the function of providing protection against the voltage of the energy reserve in the case of a wrong connection of the energy reserve, i.e., to the wrong terminal, by then unblocking this incorrectly positioned capacitor. The polarity reversal protection diode, the current source of the safety semiconductor and the voltage regulator may all be provided in an ASIC. However, it is also possible to divide these functions into two or three semiconductor processes. For example, the safety semiconductor together with the voltage regulator and the polarity reversal protection diode may be provided in a first ASIC, and the current source for diagnosis of the diagnostic function for the safety semiconductor and triggering for the safety semiconductor may be provided in a second ASIC. Other arrangements are also possible.

BRIEF DESCRIPTION OF THE DRAWING

The FIGURE shows a block diagram of the device according to the present invention.

DETAILED DESCRIPTION

Ignition elements for airbags are usually supplied with electric current for ignition only from an energy reserve capacitor. The voltage of the energy reserve capacitor must be such that a specified self-supply time of the control unit is maintained after separation from the vehicle electric system, and the function of the control unit is not affected by the voltage collapse caused by the internal resistance of the energy reserve capacitor during ignition of the control unit. It is known in the related art that a much higher energy reserve voltage is built up for compensation of the voltage drop on the internal resistor of the energy reserve capacitor than would be necessary for operation.

It is therefore provided according to the present invention that a voltage regulator be provided between the energy reserve and the ignition power module in order to always adjust the voltage at the ignition power module at the lowest possible level to minimize the power loss caused by this voltage on the ignition power modules.

The FIGURE shows a block diagram of the device according to the present invention.

An energy reserve ER is connected to ground at one end and to a module 100 at the other end. This module 100 is also connected to ground via a microcontroller 105 and finally to a diagnostic capacitor 106 and an ignition circuit trigger 107. Diagnostic capacitor 106 supplies the power required for the ignition power module tests. Ignition circuit trigger 107 has the ignition power modules for individual ignition elements 108. A negative power module is connected between ground and ignition elements 108 and one or more positive power modules are connected between module 100 and ignition element 108. In the event of deployment, these power modules are enabled by microcontroller 105 via a line, usually an SPI line, so that the ignition current is able to flow through the ignition power modules. The ignition current comes from energy reserve ER. However, the ignition current must first flow via a polarity reversal protection diode 109 and safety semiconductor 102 to reach the ignition power modules in ignition circuit trigger 107. Safety semiconductor 102 is triggered by a control module 103, which is also provided on ASIC 100. Module 103 typically triggers the gate of the power transistor to ensure the two main functions (safety semiconductor, voltage regulator) of module 100. Module 103 is therefore connected to microcontroller 105, which monitors the status (on or off) of the safety semiconductor and is also connected to ground for electric reasons. A diagnostic module 104, e.g., an activatable resistance load to ground, is also provided on module 100. Diagnostic module 104 is therefore also connected to microcontroller 105. A current source 101 supplying the diagnostic energy for ignition power module 107 via diagnostic capacitor 106 is also provided in parallel to safety semiconductor 102, in which the voltage regulator is also provided. As explained above, module 100 is connected via an output to a diagnostic capacitor 106 and to ignition circuit trigger 107, both of which are connected to ground. Diagnostic capacitor 106 supplies the energy required for the power module diagnosis. Ignition circuit trigger 107 is connected to ignition elements 108 which are supplied with ignition current from energy reserve ER via ignition power modules. The optional gate power supply having diode 110 and capacitor 111 is an attenuated energy reserve voltage, so that during an energy reserve voltage drop, a higher voltage for the gate triggering of the transistor is also available. A lower internal resistance ($R_{DS(ON)}$) of the transistor is thus achievable in the event of a drop in the energy reserve down to a voltage lower than the regulated voltage (enabling the power transistor).

What is claimed is:

1. A device for supplying an ignition current from an energy reserve capacitor to at least one ignition power module, comprising:
    a voltage regulator connected to the energy reserve capacitor by a polarity reversal diode and at least one current source, the voltage regulator being directly connected to the at least one ignition power module such that the voltage regulator sets a voltage at the at least one ignition power module at a predetermined level; and
    a control module which selectively triggers the voltage regulator to alternatively operate as a safety semiconductor.

2. The device according to claim 1, wherein the voltage regulator is disconnectable and allows an electric current to be supplied to the at least one ignition power module as a function of an external microcontroller signal.

3. The device according to claim 2, wherein a diagnosis is provided for the safety semiconductor.

4. The device according to claim 1, further comprising a safety semiconductor including at least one power transistor.

5. The device according to claim 1, wherein the at least one current source is assigned to the voltage regulator for diagnosis of the at least one ignition power module.

6. The device according to claim 3, wherein the diagnosis is provided by the current source.

* * * * *